United States Patent
Ying et al.

(10) Patent No.: US 10,636,051 B2
(45) Date of Patent: Apr. 28, 2020

(54) MODIFYING ADVERTISEMENT SIZING FOR PRESENTATION IN A DIGITAL MAGAZINE

(71) Applicant: Flipboard, Inc., Palo Alto, CA (US)

(72) Inventors: Charles H Ying, Piedmont, CA (US); Anh Mai, Berkeley, CA (US)

(73) Assignee: Flipboard, Inc., Redwood City, CA (US)

( * ) Notice: Subject to any disclaimer, the term of this patent is extended or adjusted under 35 U.S.C. 154(b) by 0 days.

(21) Appl. No.: 14/155,070

(22) Filed: Jan. 14, 2014

(65) Prior Publication Data

US 2015/0199708 A1 Jul. 16, 2015

(51) Int. Cl.
*G06Q 30/02* (2012.01)

(52) U.S. Cl.
CPC ..... *G06Q 30/0241* (2013.01); *G06Q 30/0251* (2013.01)

(58) Field of Classification Search
CPC .................................................. G06Q 30/0276
USPC .............................................. 705/14.1–14.73
See application file for complete search history.

(56) References Cited

U.S. PATENT DOCUMENTS

| 8,467,601 B2* | 6/2013 | Daisy | G06T 15/205 382/162 |
| 8,577,166 B1* | 11/2013 | Ferguson et al. | 382/255 |
| 8,688,522 B2* | 4/2014 | Gern | G06Q 30/02 705/14.72 |
| 2010/0324997 A1* | 12/2010 | Evans | G06Q 30/02 705/14.69 |
| 2011/0029914 A1* | 2/2011 | Whitby | G06T 11/60 715/781 |
| 2013/0018732 A1* | 1/2013 | Evans | 705/14.72 |
| 2014/0122255 A1* | 5/2014 | Snyder | G06Q 30/0276 705/14.72 |

OTHER PUBLICATIONS

PCT International Search Report and Written Opinion for PCT/US15/11219, dated Apr. 17, 2015, 11 Pages.
Extended European Search Report for European Patent Application No. EP 15737944.7, dated May 22, 2017, 7 Pages.

* cited by examiner

*Primary Examiner* — Sam Refai
(74) *Attorney, Agent, or Firm* — Fenwick & West LLP

(57) ABSTRACT

A digital magazine server separates an advertisement received for presentation to one or more digital magazine server users into a plurality of layers, each including one or more elements of the advertisement. For example, one or more foreground layers and one or more background layers of an advertisement are identified. By modifying elements included in different layers, modified advertisements associated with different display sizes are generated and associated with the display sizes. When presenting the advertisement to a user, the digital magazine server determines a size of a slot in which the advertisement is to be presented and retrieves a modified advertisement associated with the size of the slot for presentation to the user.

17 Claims, 5 Drawing Sheets

MODIFYING ADVERTISEMENT SIZING FOR PRESENTATION IN A DIGITAL MAGAZINE

BACKGROUND

This invention generally relates to advertisements presented in a digital magazine, and more specifically to resizing advertisements presented to a user via a digital magazine.

Digital content may be provided to users of a digital magazine server as a digital magazine that arranges content items in positions relative to each other in various pages. However, users often view the digital magazine from various types of devices having different display areas. Additionally, users may customize presentation of content items in the digital magazine based on specified preferences. Accordingly, content items included in the digital magazine may be presented using different dimensions on various devices or using different dimensions for various users.

A digital magazine may present one or more advertisements to users along with content items, allowing a provider of the digital magazine server to obtain revenue from advertisers for presenting advertisements. Because of the different devices and preferences for presenting content items to users, resizing advertisements for presentation using different display dimensions allows presentation of advertisements along with content items in a digital magazine. However, conventional methods for resizing an advertisement may obscure information in the advertisement likely to encourage a user to interact with the advertisement.

SUMMARY

A digital magazine server retrieves content from one or more sources and generates a personalized, customizable digital magazine for a user based on the retrieved content. The digital magazine server organizes content items having at least one common characteristic into various sections based on page templates describing the relative positioning of content items to each other. Content items are presented to the user according to the sections. One or more advertisements ("ads") may be included in the retrieved content. For example, the digital magazine server also receives advertisements ("ads") from one or more sources and selects one or more of the ads for presentation to a user along with additional content. However, users may view content from the digital magazine server using different client devices with varying display areas and/or display resolutions. To improve presentation of advertisements to users via a digital magazine, the digital magazine server identifies foreground layers and background layers of an advertisement ("ad"). Additionally, the digital magazine server identifies regions of the ad to remain uncovered by text or other content ("protected regions") when presented to the user. A set of key frames are generated for the advertisement. Each key frame is an identifier specifying dimensions of an image or other representation of the advertisement. A key frame may be associated with dimensions of a slot in one or more page templates.

The digital magazine server generates modified ads associated with each key frame by modifying one or more of the foreground layers and background layers from an ad. For example, a foreground layer and/or a background layer of a key frame are resized to generate a modified ad associated with the key frame. Protected regions of the ad may be identified and used to identify regions of the ad to be presented in a modified ad. The digital magazine server stores the modified ads and identifiers associated with a key frame from which a modified ad was generated. When a section of a digital magazine is displayed to a user, a slot in the template used to generate the section includes an ad. A key frame associated with the ad is determined based on a size of the slot including the ad, and a modified ad associated with the determined key frame is identified. The modified ad is then presented to the user in the section of the digital magazine based on the location and size associated with the slot.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A digital magazine server retrieves content from one or more sources and generates a personalized, customizable digital magazine for a user based on the retrieved content. The generated digital magazine is retrieved by a digital magazine application executing on a computing device (such as a mobile communication device, tablet, computer, or any other suitable computing system) and presented to the user. For example, based on selections made by the user and/or on behalf of the user, the digital server application generates a digital magazine including one or more sections including content items retrieved from a number of sources and personalized for the user. The generated digital magazine allows the user to more easily consume content that interests and inspires the user by presenting content items in an easily navigable interface via a computing device.

The digital magazine may be organized into a number of sections that each include content having a common characteristic (e.g., content obtained from a particular source). For example, a section of the digital magazine includes articles from an online news source (such as a website for a news organization), another section includes articles from a third-party-curated collection of content associated with a particular topic (e.g., a technology compilation), and an additional section includes content obtained from one or more accounts associated with the user and maintained by one or more social networking systems. For purposes of illustration, content included in a section is referred to herein as "content items" or "articles," which may include textual articles, pictures, videos, products for sale, user-generated content (e.g., content posted on a social networking system), advertisements (ad), and any other types of content capable of display within the context of a digital magazine.

System Architecture

Figure 1:
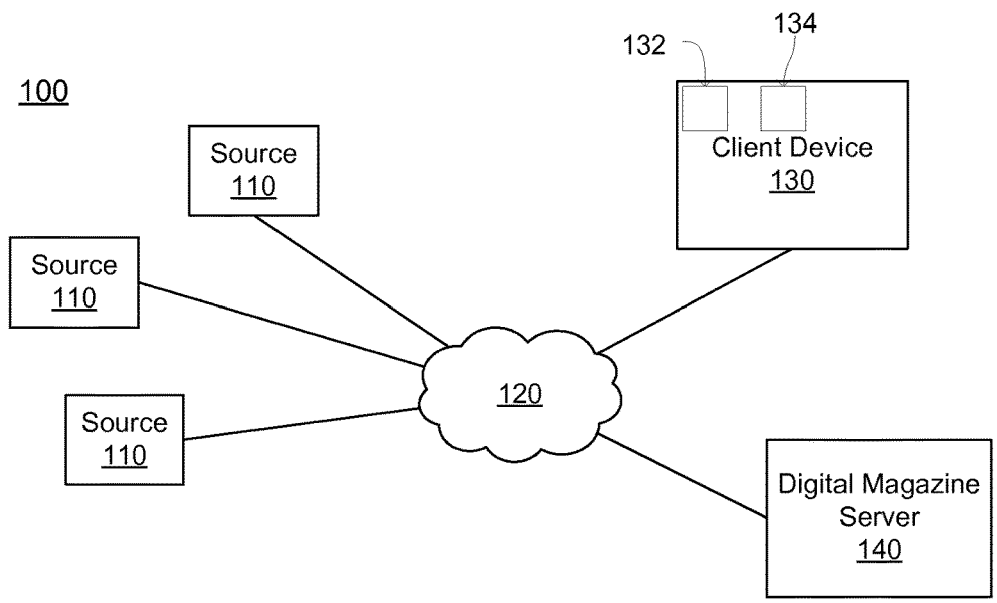
FIG. 1 is a block diagram of a system environment in which a digital magazine server operates, in accordance with an embodiment of the invention.

FIG. 1 is a block diagram of a system environment 100 for a digital magazine server 140. The system environment 100 shown by FIG. 1 comprises one or more sources 110, a network 120, a client device 130, and the digital magazine server 140. In alternative configurations, different and/or additional components may be included in the system environment 100. The embodiments described herein can be adapted to online systems that are not digital magazine severs 140.

A source 110 is a computing system capable of providing various types of content to a client device 130. Examples of content provided by a source 110 include text, images, video, or audio on web pages, web feeds, social networking information, messages, or other suitable data. Additional examples of content include user-generated content such as blogs, tweets, shared images, video or audio, social networking posts, and social networking status updates. Content provided by a source 110 may be received from a publisher (e.g., stories about news events, product information, entertainment, or educational material) and distributed by the source 110, or a source 110 may be a publisher of content it generates. For convenience, content from a source, regardless of its composition, may be referred to herein as an "article," a "content item," or as "content." A content item may include various types of content, such as text, images, and video.

The sources 110 communicate with the client device 130 and the digital magazine server 140 via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The client device 130 is one or more computing devices capable of receiving user input as well as transmitting and/or receiving data via the network 120. In one embodiment, the client device 130 is a conventional computer system, such as a desktop or a laptop computer. Alternatively, the client device 130 may be a device having computer functionality, such as a personal digital assistant (PDA), a mobile telephone, a smartphone or another suitable device. In one embodiment, the client device 130 executes an application allowing a user of the client device 110 to interact with the digital magazine server 140. For example, an application executing on the client device 130 communicates instructions or requests for content items to the digital magazine server 140 to modify content presented to a user of the client device 130. As another example, the client device 130 executes a browser that receives pages from the digital magazine server 140 and presents the pages to a user of the client device 130. In another embodiment, the client device 130 interacts with the digital magazine server 140 through an application programming interface (API) running on a native operating system of the client device 110, such as IOSO or ANDROID™. While FIG. 1 shows a single client device 130, in various embodiments, any number of client devices 130 may communicate with the digital magazine server 140.

A display device 132 included in the client device 130 presents content items to a user of the client device 130. Examples of the display device 132 include a liquid crystal display (LCD), an organic light emitting diode (OLED) display, an active matrix liquid crystal display (AMLCD), or any other suitable device. Different client devices 130 may have display devices 132 with different characteristics. For example, different client devices 132 have display devices 132 with different display areas, different resolutions, or differences in other characteristics.

One or more input devices 134 included in the client device 130 receive input from the user. Different input devices 134 may be included in the client device 130. For example, the client device 130 includes a touch-sensitive display for receiving input data, commands, or information from a user. Using a touch-sensitive display allows the client device 130 to combine the display device 132 and an input device 134, simplifying user interaction with presented content items. In other embodiments, the client device 130 may include a keyboard, a trackpad, a mouse, or any other device capable of receiving input from a user. In another example, the input device 134 is configured to receive information from a user of the client device through a touchless interface. Examples of a touchless interface include sensors, such as an image capture device, to receive gestures from a client device user without the user physically contacting the display device 132 or the client device 130. Additionally, the client device may include multiple input devices 134 in some embodiments. Inputs received via the input device 134 may be processed by a digital magazine application associated with the digital magazine server 140 and executing on the client device 130 to allow a client device user to interact with content items presented by the digital magazine server 140.

The digital magazine server 140 receives content items from one or more sources 110, generates pages in a digital magazine by processing the received content, and provides the pages to the client device 130. As further described below in conjunction with FIG. 2, the digital magazine server 140 generates one or more pages for presentation to a user based on content items obtained from one or more sources 110 and information describing organization and presentation of content items. For example, the digital magazine server 140 determines a page layout specifying positioning of content items relative to each other based on information associated with a user and generates a page including the content items arranged according to the determined layout for presentation to the user via the client device 130. This allows the user to access content items via the client device 130 in a format that enhances the user's interaction with and consumption of the content items. For example, the digital magazine server 140 provides a user with content items in a format similar to the format used by print magazines. By presenting content items in a format similar to a print magazine, the digital magazine server 140 allows a user to interact with content items from multiple sources 110 via the client device 130 with less inconvenience from horizontally or vertically scrolling to access various content items.

Figure 2:
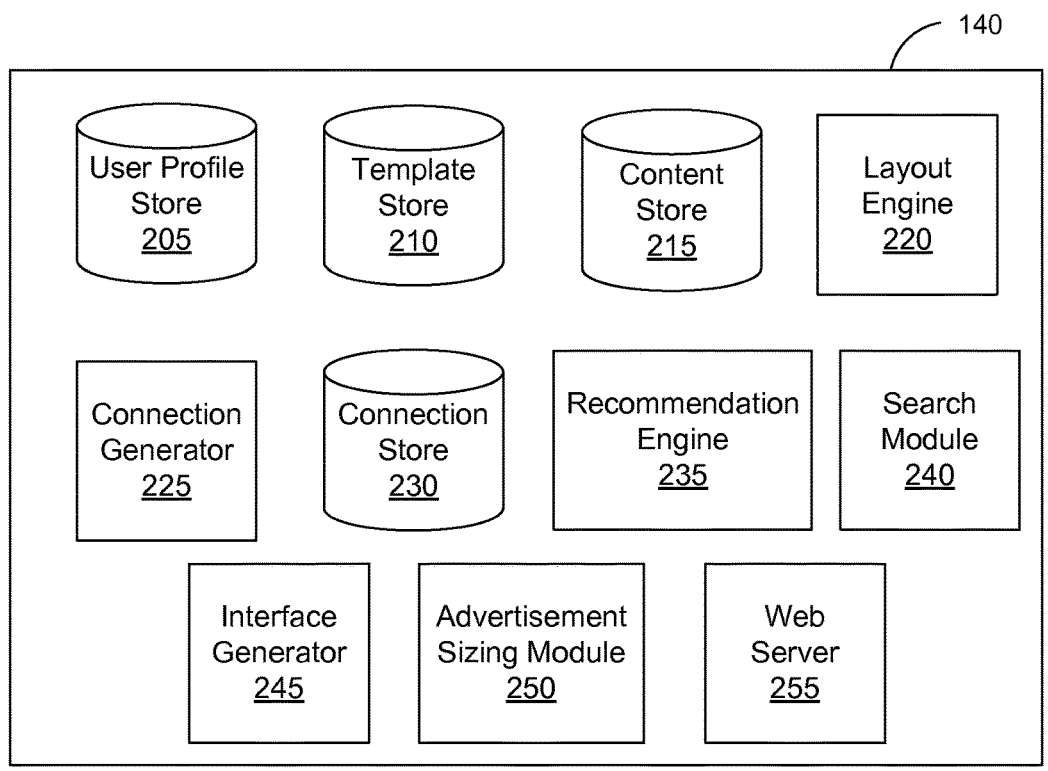
FIG. 2 is a block diagram of a digital magazine server, in accordance with an embodiment of the invention.

FIG. 2 is a block diagram of an architecture of the digital magazine server 140. The digital magazine server 140 shown in FIG. 2 includes a user profile store 205, a template store 210, a content store 215, a layout engine 220, a connection generator 225, a connection store 230, a recommendation engine 235, a search module 240, an interface generator 245, advertisement (ad) sizing module 250, and a web server 255. In other embodiments, the digital magazine server 140 may include additional, fewer, or different components for various applications. Conventional components such as network interfaces, security functions, load balancers, failover servers, management and network operations consoles, and the like are not shown so as to not obscure the details of the system architecture.

Each user of the digital magazine server 140 is associated with a user profile, which is stored in the user profile store 205. A user profile includes declarative information about the user that was explicitly shared by the user and may also include profile information inferred by the digital magazine server 140. In one embodiment, a user profile includes multiple data fields, each describing one or more attributes of the corresponding social networking system user. Examples of information stored in a user profile include biographic, demographic, and other types of descriptive information, such as gender, hobbies or preferences, location, or other suitable information. A user profile in the user profile store 205 also includes data describing interactions by a corresponding user with content items presented by the digital magazine server 140. For example, a user profile includes a content item identifier, a description of an interaction with the content item corresponding to the content item identifier, and a time when the interaction occurred.

While user profiles in the user profile store 205 are frequently associated with individuals, allowing individuals to provide and receive content items via the digital magazine server 140, user profiles may also be stored for entities such as businesses or organizations. This allows an entity to provide or access content items via the digital magazine server 140. An entity may post information about itself, about its products or provide other content items associated with the entity to users of the digital magazine server 140. For example, users of the digital magazine server 140 may receive a digital magazine or section including content items associated with an entity via the digital magazine server 140.

The template store 210 includes page templates each describing a spatial arrangement ("layout") of content items relative to each other on a page for presentation by a client device 130. A page template includes one or more slots, each configured to present one or more content items. In some embodiments, slots in a page template may be configured to present a particular type of content item or to present a content item having one or more specified characteristics. For example, a slot in a page template is configured to present an image while another slot in the page template is configured to present text data. Each slot has a size (e.g., small, medium, or large) and an aspect ratio. One or more page templates may be associated with types of client devices 130, allowing content items to be presented in different relative locations and with different sizes when the content items are viewed using different client devices 130. Additionally, page templates may be associated with sources 110, allowing a source 110 to specify the format of pages presenting content items received from the source 110. For example, an online retailer is associated with a page template to allow the online retailer to present content items via the digital magazine server 140 with a specific organization. Examples of page templates are further described in U.S. patent application Ser. No. 13/187,840, filed on Jul. 21, 2011, which is hereby incorporated by reference in its entirety.

The content store 215 stores objects that each represent various types of content. For example, the content store 215 stores content items received from one or more sources 115 within a threshold time of a current time. Examples of content items stored by the content store 215 include a page post, a status update, a photograph, a video, a link, an article, video data, audio data, a check-in event at a location, or any other type of content. A user may specify a section including content items having a common characteristic, and the common characteristic is stored in the content 215 store along with an association with the user profile or the user specifying the section.

The layout engine 220 retrieves content items from one or more sources 110 or from the content store 215 and generates a page including the content items based on a page template from the template store 210. Based on the retrieved content items, the layout engine 220 may identify candidate page templates from the template store 210, score the candidate page templates based on characteristics of the slots in different candidate page templates and based on characteristics of the content items. Based on the scores associated with candidate page templates, the layout engine 220 selects a page template and associates the retrieved content items with one or more slots to generate a page where the retrieved content items are presented relative to each other and sized based on their associated slots. When associating a content item with a slot, the layout engine 220 may associate the content item with a slot configured to present a specific type of content item or to present content items having one or more specified characteristics. An example of using a page template to present content items is further described in U.S. patent application Ser. No. 13/187, 840, filed on Jul. 21, 2011, which is hereby incorporated by reference in its entirety.

The connection generator 225 monitors interactions between users and content items presented by the digital magazine server 140. Based on the interactions, the connection generator 225 determines connections between various content items, connections between users and content items, or connections between users of the digital magazine server 140. For example, the connection generator 225 identifies when users of the digital magazine server 140 provide feedback about a content item, access a content item, share a content item with other users, or perform other actions with content items. In some embodiments, the connection generator 225 retrieves data describing user interaction with content items from the user's user profile in the user profile store 205. Alternatively, user interactions with content items are communicated to the connection generator 225 when the interactions are received by the digital magazine server 140. The connection generator 225 may account for temporal information associated with user interactions with content items. For example, the connection generator 225 identifies user interactions with a content item within a specified time interval or applies a decay factor to identified user interactions based on times associated with interactions. The connection generator 225 generates a connection between a user and a content item if the user's interactions with the content item satisfy one or more criteria. In one embodiment, the connection generator 225 determines one or more weights specifying a strength of the connection between the user and the content item based on user interactions with the content item that satisfy one or more criteria. Generation of connections between a user and a content item is further described in U.S. patent application Ser. No. 13/905,016, filed on May 29, 2013, which is hereby incorporated by reference in its entirety.

If multiple content items are connected to a user, the connection generator 225 establishes implicit connections between each of the content items connected to the user. In one embodiment, the connection generator 225 maintains a user content graph identifying the implicit connections between content items connected to a user. In one embodiment, weights associated with connections between a user and content items are used to determine weights associated with various implicit connections between content items. User content graphs for multiple users of the digital magazine server 140 are combined to generate a global content graph describing connections between various content items provided by the digital magazine server 140 based on user interactions with various content items. For example, the global content graph is generated by combining user content graphs based on mutual connections between various content items in user content graphs.

In one embodiment, the connection generator 225 generates an adjacency matrix from the global content graph or from multiple user content graphs and stores the adjacency matrix in the connection store 230. The adjacency matrix describes connections between content items. For example, the adjacency matrix includes identifiers of content items and weights representing the strength or closeness of connections between content items based on the global content graph. As an example, the weights indicate a degree of similarity in subject matter or similarity of other characteristics associated with various content items. In other embodiments, the connection store 230 includes various adjacency matrices determined from various user content graphs; the adjacency matrices may be analyzed to generate an overall adjacency matrix for content items provided by the digital magazine server 140. Graph analysis techniques may be applied to the adjacency matrix to rank content items, to recommend content items to a user, or to otherwise analyze relationships between content items. An example of the adjacency matrix is further described in U.S. patent application Ser. No. 13/905,016, filed on May 29, 2013, which is hereby incorporated by reference in its entirety.

In addition to identifying connections between content items, the connection generator 225 may also determine a social proximity between users of the digital magazine server 140 based on interactions between users and content items. The digital magazine server 140 determines social proximity, or "social distance," between users using a variety of techniques. For example, the digital magazine server 140 analyzes additional users connected to each of two users of the digital magazine server 140 within a social networking system to determine the social proximity of the two users. In another example, the digital magazine server 140 determines social proximity between a first and a second user by analyzing the first user's interactions with content items posted by the second user, whether the content item is posted using the digital magazine server 140 or on another social networking system. Additional examples for determining social proximity between users of the digital magazine server 140 are described in U.S. patent application Ser. No. 13/905,016, filed on May 29, 2013, which is incorporated by reference in its entirety. In one embodiment, the connection generator 225 determines a connection confidence value between a user and an additional user of the digital magazine server 140 based on the user's and the additional user's common interactions with particular content items. The connection confidence value may be a numerical score representing a measure of closeness between the user and the additional user. For example, a larger connection confidence value indicates a greater similarity between the user and the additional user. In one embodiment, if a user has at least a threshold connection confidence value with another user, the digital magazine server 140 stores a connection between the user and the additional user in the connection store 230.

Using data from the connection store 230, the recommendation engine 235 identifies content items from one or more sources 110 for recommending to a digital magazine server user. Hence, the recommendation engine 235 identifies content items potentially relevant to a user. In one embodiment, the recommendation engine 235 retrieves data describing interactions between a user and content items from the user's user profile and data describing connections between content items, and/or connections between users from the connection store 230. In one embodiment, the recommendation engine 235 uses stored information describing content items (e.g., topic, sections, subsections) and interactions between users and various content items (e.g., views, shares, saved, links, topics read, or recent activities) to identify content items that may be relevant to a digital magazine server user. For example, content items having an implicit connection of at least a threshold weight to a content item with which the user interacted are recommended to the user. As another example, the recommendation engine 235 presents a user with content items having one or more attributes in common with a content item with which an additional user having a threshold connection confidence score with the user interacted. Recommendations for additional content items may be presented to a user when the user views a content item using the digital magazine, may be presented as a notification to the user by the digital magazine server 140, or may be presented to the user through any suitable communication channel.

In one embodiment, the recommendation engine 235 applies various filters to content items received from one or more sources 110 or from the content store 215 to efficiently provide a user with recommended content items. For example, the recommendation engine 235 analyzes attributes of content items in view of characteristics of a user retrieved from the user's user profile. Examples of attributes of content items include a type (e.g., image, story, link, video, audio, etc.), a source 110 from which a content item was received, time when a content item was retrieved, and subject matter of a content item. Examples of characteristics of a user include biographic information about the user, users connected to the user, and interactions between the user and content items. In one embodiment, the recommendation engine 235 analyzes attributes of content items in view of a user's characteristics for a specified time period to generate a set of recommended content items. The set of recommended content items may be presented to the user or may be further analyzed based on user characteristics and on content item attributes to generate more refined set of recommended content items. A setting included in a user's user profile may specify a length of time that content items are analyzed before identifying recommended content items to the user, allowing a user to balance refinement of recommended content items with time used to identify recommended content items.

The search module 240 receives a search query from a user and retrieves content items from one or more sources 110 based on the search query. For example, content items having at least a portion of an attribute matching at least a portion search query are retrieved from one or more sources 110. The user may specify sources 110 from which content items are received through settings maintained by the user's user profile or by identifying one or more sources in the search query. In one embodiment, the search module 240 generates a section of the digital magazine including the content items identified based on the search query, as the identified content items have a common attribute of their association with the search query. Presenting identified content items identified from a search query allows a user to more easily identify additional content items at least partially matching the search query when additional content items are provided by sources 110.

To more efficiently identify content items based on search queries, the search module 110 may index content items, groups (or sections) of content items, and user profile information. In one embodiment, the index includes information about various content items, such as author, source, topic, creation data/time, user interaction information, document title, or other information capable of uniquely identifying the content item. Search queries are compared to information maintained in the index to identify content items for presentation to a user. The search module 140 may present identified content items based on a ranking One or more factors associated with the content items may be used to generate the ranking Examples of factors include: global popularity of a content item among users of the digital magazine server 140, connections between users interacting with a content item and the user providing the search query, and information from a source 110. Additionally, the search module 240 may assign a weight to the index information associated with each content item selected based on similarity between the index information and a search query and rank the content items based on their weights. For example, content items identified based on a search query are presented in a section of the digital magazine in an order based in part on the ranking of the content items.

To increase user interaction with the digital magazine, the interface generator 245 maintains instructions associating received input with actions performed by the digital magazine server 140 or by a digital magazine application executing on a client device 130. For example, instructions maintained by the interface generator 245 associate types of inputs or specific inputs received via an input device 132 of a client device 130 with modifications to content presented by a digital magazine. As an example, if the input device 132 is a touch-sensitive display, the interface generator 245 includes instructions associating different gestures with navigation through content items or presented via a digital magazine. Instructions from the interface generator 245 are communicated to a digital magazine application or other application executing on a client device 130 on which content from the digital magazine server 140 is presented. Inputs received via an input device 132 of the client device 130 are processed based on the instructions when content items are presented via the digital magazine server 140 is presented to simplify user interaction with content presented by the digital magazine server 140.

The ad sizing module 250 generates potential ads from advertisements ("ads") received by the digital magazine server 140 from various sources 110. As further described below in conjunction with FIG. 4, the ad sizing module 250 identifies various layers and key frames of an advertisement and generates modified advertisements based on the key frames and layers. When the layout engine 220 generates a page, or section, of a digital magazine using a page template, one or more slots in the page template may be associated with an advertisement (ad). The ad sizing module 250 identifies the slot associated with the ad, and retrieves a modified ad based on one or more dimensions of the identified slot. Hence, the ad sizing module 250 identifies a modified ad for presentation in the identified slot that allows the informative and contextual value of the advertisement to be preserved when the advertisement is presented using slots with varying dimensions.

The web server 255 links the digital magazine server 140 via the network 120 to the one or more client devices 130, as well as to the one or more sources 110. The web server 255 serves web pages, as well as other content, such as JAVA®, FLASH®, XML and so forth. The web server 255 may retrieve content item from one or more sources 110. Additionally, the web server 255 communicates instructions for generating pages of content items from the layout engine 220 and instructions for processing received input from the interface generator 245 to a client device 130 for presentation to a user. The web server 255 also receives requests for content or other information from a client device 130 and communicates the request or information to components of the digital magazine server 140 to perform corresponding actions. Additionally, the web server 255 may provide application programming interface (API) functionality to send data directly to native client device operating systems, such as IOS®, ANDROID™, WEBOS®, or BlackberryOS.

For purposes of illustration, FIG. 2 describes various functionalities provided by the digital magazine server 140. However, in other embodiments, the above-described functionality may be provided by a digital magazine application executing on a client device 130, or may be provided by a combination of the digital magazine server 140 and a digital magazine application executing on a client device 130. For example, ads may be resized based on modified ads associated with key frames of the ad and presented by a digital magazine application executing on the client device 130. Alternatively, information identifying slots of a page template used to generate a page of a digital magazine are communicated from a client device 130 to the digital magazine server 140, which identifies one or more modified ads for presentation in content regions of a page corresponding to slots in a page template associated with ads; the modified ads are communicated from the digital magazine server 140 to the client device 130 for presentation.

Page Templates

Figure 3:
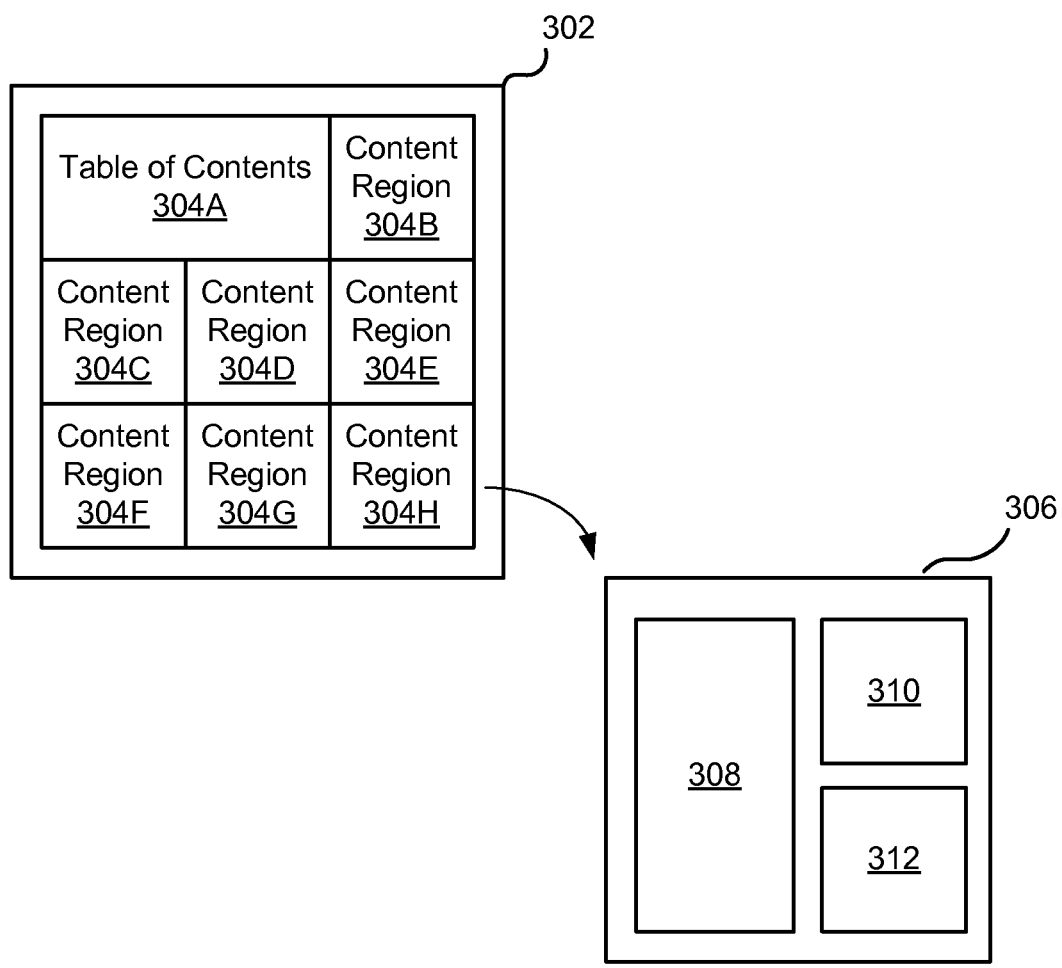
FIG. 3 is an example of presentation of content items in a digital magazine using a page template, in accordance with an embodiment of the invention.

FIG. 3 illustrates an example page template 302 having multiple rectangular slots each configured to present a content item. Other page templates with different configurations of slots may be used by the digital magazine server 140 to present one or more content items received from sources 110. As described above in conjunction with FIG. 2, in some embodiments, one or more slots in a page template are reserved for presentation of content items having specific characteristics or for presentation of a specific type of content item. In one embodiment, the size of a slot may be specified as a fixed aspect ratio or using fixed dimensions. Alternatively, the size of a slot may be flexible, where the aspect ratio or one or more dimensions of a slot is specified as a range, such as a percentage of a reference or a base dimension. Arrangement of slots within a page template may also be hierarchical. For example, a page template is organized hierarchically, where an arrangement of slots may be specified for the entire page template or for one or more portions of the page template.

In the example of FIG. 3, when a digital magazine server 140 generates a page for presentation to a user, the digital magazine server 140 populates slots in a page template 302 with content items. Information identifying the page template 302 and associations between content items and slots in the page template 302 is stored and used to generate the page. For example, to present a page to a user, the layout engine 220 identifies the page template 102 from the template store 210 and retrieves content items from one or more sources 110 or from the content store 215. The layout engine 220 generates data or instructions associating content items with slots within the page template 302. Hence, the generated page includes various "content regions" presenting one or more content items associated with a slot in a location specified by the slot.

A content region 304 may present image data, text, data, a combination of image and text data, or any other information retrieved from a corresponding content item. For example, in FIG. 3, the content region 304A represents a table of contents identifying sections of a digital magazine, and content associated with the various sections are presented in content regions 304B-304H. For example, content region 304A includes text or other data indicating that the presented data is a table of contents, such as the text "Cover Stories Featuring," followed by one or more identifiers associated with various sections of the digital magazine. In one embodiment, an identifier associated with a section describes a characteristic common to at least a threshold number of content items in the section. For example, an identifier refers to the name of a user of social network from which content items included in the section are received. As another example, an identifier associated with a section specifies a topic, an author, a publisher (e.g., a newspaper, a magazine) or other characteristic associated with at least a threshold number of content items in the section. Additionally, an identifier associated with a section may further specify content items selected by a user of the digital magazine server 140 and organized as a section. Content items included in a section may be related topically and include text and/or images related to the topic.

Sections may be further organized into subsections, with content items associated with one or more subsections presented in content regions. Information describing sections or subsections, such as a characteristic common to content items in a section or subsection, may be stored in the content store 215 and associated with a user profile to simplify generation of a section or subsection for the user. A page template associated with a subsection may be identified, and slots in the page template associated with the subsection used to determine presentation of content items from the subsection relative to each other. Referring to FIG. 3, the content region 304H includes a content item associated with a newspaper to indicate a section including content items retrieved from the newspaper. When a user interacts with the content region 304, a page template associated with the section is retrieved, as well as content items associated with the section. Based on the page template associated with the section and the content items, the digital magazine server 140 generates a page presenting the content items based on the layout described by the slots of the page template. For example, in FIG. 3, the section page 306 includes content regions 308, 310, 312 presenting content items associated with the section. The content regions 308, 310, 312 may include content items associated with various subsections including content items having one or more common characteristics (e.g., topics, authors, etc.). Hence, a subsection may include one or more subsections, allowing hierarchical organization and presentation of content items by a digital magazine.

Modifying Ads for Presentation Using Different Sized Slots

Figure 4:
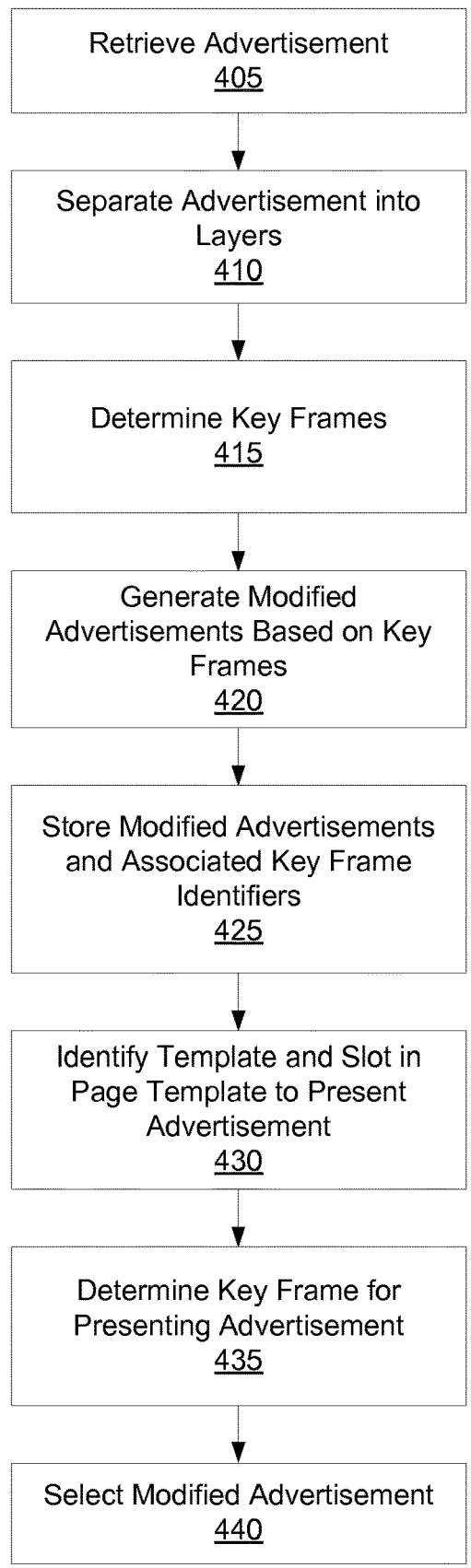
FIG. 4 shows a flow chart of a method for resizing ads in a digital magazine, in accordance with an embodiment of the invention.

FIG. 4 shows a flow chart of one embodiment of a method for modifying ads for presentation via a digital magazine. In one embodiment, the functionality described in conjunction with FIG. 4 is performed by the ad sizing module 250; however, in other embodiments, any suitable component or combination of components may perform the functionality described in conjunction with FIG. 4. Additionally, in some embodiments, different and/or additional steps than those identified in FIG. 4 may be performed or the steps identified in FIG. 4 may be performed in different orders.

The digital magazine server 140 receives ads from one or more sources 110 for presentation to a user of the digital magazine server 140 in a digital magazine. For example, the digital magazine server 140 receives advertisement requests (ad requests) each including an advertisement and a bid amount from one or more sources. In some embodiments, an ad request may also include one or more targeting criteria identifying characteristics of users eligible to be presented with an advertisement included in the ad request. Received ad requests may be stored in the content store 215 and retrieved 405 for presentation to a user of the digital magazine server 140. For example, content item identifiers associated with an ad request are identified to retrieve 405 an advertisement from the content store 215. Alternatively, the digital magazine server 140 may retrieve 405 one or more advertisements from a source 110 by sending a request to the source 110 for one or more advertisements.

An advertisement (ad) from a received ad request is separated 410 into a plurality of layers. For example, the advertisement is separated 410 into one or more foreground layers and one or more background layers. The foreground of an ad includes elements of the ad identified as the primary focus of the ad; hence, the foreground of an ad frequently includes information adding informative or contextual value to the ad, so an ad's foreground typically includes elements with a higher priority to be presented to a user. For example, an ad for health insurance may include a person, a logo of the insurance provider, a narrative of insurance information and scenery of a meadow and some hills. In this example, the foreground of the ad includes the person and the logo of the insurance provider. The background of an ad includes elements of the ad having a relatively lower priority for presentation to a user than elements in the foreground. Hence, elements in an ad's background may be modified or removed without reducing the contextual or informative value of the ad. In the preceding example of the health insurance ad, the background of the ad includes the scenery of the meadow and the hills.

Various image processing methods may be used to identify the foreground and background of the ad to determine one or more foreground layers and one or more background layers of the ad. For example, one or more image processing methods are applied to differentiate between the foreground and background of an ad that is an image based on the relative sharpness of components. Alternatively, an ad received from a source includes various layers and information identifying elements of the ads in various layers. In one embodiment, received ads that do not include information identifying various layers are manually reviewed when received by the digital magazine server 140, with layers of the ad identified based on the manual review. Alternatively, the digital magazine server 140 may use image processing methods to separate 410 a received ad into various layers.

Example image processing methods for separating 410 a received ad into layers include methods based on the sharpness of regions in an ad, methods based on the color composition of regions in an ad, and methods based on the number of edges of identified objects in an ad.

The foreground of an ad may include multiple layers, and the background of the ad may also include multiple layers. Each layer may include different elements of the ad, allowing different elements of the ad to be identified. For example, in the health insurance advertisement including the person, the insurance provider logo, the narrative of insurance information, and scenery of the meadow and hills, the foreground includes a layer including the person and another layer including the insurance provider logo. In some embodiments, additional layers of the advertisement are identified, allowing different types of elements of the advertisement to be identified by different types of layers. For example, a text layer including text from an ad is identified; in the preceding example ad for health insurance, a text layer includes the narrative of the insurance information.

Additionally, one or more protected regions of an ad are identified when the ad is separated 410 into layers. A protected region of an ad includes elements or other components of the ad having a highest priority for presentation to a user. Hence, elements associated with a protected region are not obscured or removed from the advertisement. In various embodiments, an advertiser includes information with an ad identifying protected regions of the ad or information for identifying protected regions of the ad. Alternatively, the advertiser includes information identifying unprotected regions of an ad. In the preceding example of the health insurance ad, the logo and the face of the person may be identified as protected regions.

In other embodiments, received ads are manually reviewed when received by the digital magazine server 140, and protected regions of the ad are identified based on the manual review. Alternatively, the digital magazine server 140 may use image processing methods to identify one or more protected regions within an ad. Example image processing methods for identifying protected regions in an ad include methods based on the sharpness of regions in an ad, methods based on the color composition of regions in an ad, and methods based on the number of edges of identified objects in an ad. For example, one or more image processing methods may be used to identify elements in an advertisement not to be obscured, and one or more protected regions are identified based on the identified elements. As an example, one or more image processing methods are used to identify faces or people included in an ad image, with regions within a threshold distance of an identified face as protected regions. Additionally, image processing and text recognition and matching methods may be used to identify a logo associated with an advertiser associated with an ad; a region surrounding the identified logo may then be identified as a protected region.

Additionally, various key frames each identifying sizes in which an ad may be displayed are determined 415. A key frame identifies dimensions of a region of a display device 132 in which an ad is presented. In one embodiment, a key frame identifier is associated with a length and width of a region of the display device 132 specified in pixels. For example, a key frame is associated with a display region that is 1024 pixels wide and 768 pixels high.

Based on sizes of slots in one or more page templates, one or more target key frames are determined 415 specifying sizes of display regions associated with various slots in the page template. For example, information in a page template identifying sizes of slots in the page template is retrieved from the template store 210 and used to identify one or more target key frames associated with the page template. In one embodiment, a smallest slot size and a largest slot size are identified from a page template, and a set of key frames associated with display area sizes at various intervals between the smallest slot size and the largest slot size (e.g., target key frames associated with sizes equally spaced between the smallest slot size and largest slot size in the page template). Alternatively, the slot sizes associated with slots most frequently presented to users of the digital magazine server 140 are identified and target key frames having at least a threshold similarity to the identified slots are determined 415. As another example, a set of target key frames including a key frame associated with slot sizes of slots previously used to present content to a user is determined 415. In some embodiments, different groups of target key frames are determined 415 based on the orientation of slots. For example, a set including target key frames having a width greater than a height is determined 415 based on prior presentation of content in slots and an additional set including target key frames having a height greater than a width is also determined 415 based on prior selection of slots for presentation of content.

One or more modified ads are generated 420 by modifying elements included in different layers of the ad based at least in part on the determined target key frames. In various embodiments, elements of the ad are differently modified depending on whether they are included in a foreground layer or in a background layer to generate 420 modified ads. Each modified ad is generated 420 based on a key frame so the modified ad is capable of being presented in a display region determined from the key frame used to generate the modified ad. Modifying elements of the ad depending on the layer including the elements allows a modified ad to preserve the informative and contextual value of the ad when presented in a display region having a size associated with the key frame.

In one embodiment, generating 420 a modified ad scales elements included in a foreground layer based on the dimensions of a target key frame. For example, if the received ad has dimensions of 1024×768 pixels, and a key frame has dimensions of 400×300 pixels, elements in a foreground layer of the ad are scaled to have dimensions of 400×300 pixels. Various image processing methods may be used to scale elements in a foreground layer of the ad. Examples of image processing methods for scaling elements in a foreground layer include nearest neighbor interpolation, bilinear interpolation, high quality magnification (hqx), supersampling or vectorization. Additionally, various combinations of methods for scaling may be applied to elements in a foreground layer.

Additionally, elements included in a background layer may be modified differently than elements included in a foreground layer. For example, elements in a background layer are cropped to fit within the dimensions of a target key frame. For example, if the received ad has dimensions of 1024×768 pixels, and a key frame has dimensions of 400× 300 pixels, elements in various background layers of the ad are cropped so the background layers have a dimension of 400×300 pixels. Various image processing methods may be used to crop the background layers of an ad. For example, feature detection and extraction methods, such as Hough transforms and edge detection, are applied to a background layer and used to identify portions of the elements in the background layer to crop. As an example, elements in a background layer having less than a threshold size are removed, while elements having at least the threshold size are retained. Alternatively, dimensions of the background layer are cropped by a proportional amount to reduce the dimensions of the background layer to match dimensions of a key frame.

Additionally, if the ad includes one or more protected regions, the protected regions are scaled to occupy a proportional area of the modified ad as in the received ad. For example, a protected region in a received ad having a size of 1024×768 pixels occupies a 300×200 pixel region of the ad; when a modified ad of 400×300 is generated from the 1024×768 ad, the protected region is reduced from a size of 300×200 pixels to a size of 118×79 pixels in the modified ad. Information may be determined from the received advertisement and the size of the key frame to preserve the relative position of the protected region to elements of the advertisement in the modified advertisement. For example, the location of a protected region is determined based on distances from one or more boundaries of the received ad, and the determined distances are scaled based on a factor determined from a size of the received ad and a size of the key frame; the protected region is positioned in the modified ad at a location determined by the scaled distances from boundaries of the modified ad corresponding to boundaries of the received ad. As an example, in an ad having a protected region located 50 pixels from an upper boundary of the ad and 32 pixels from a leftmost boundary of the ad, the position of the protected region in a modified ad is determined by scaling the distance from the upper boundary by a factor based on a height of the ad and a height of a key frame associated with the modified ad and identifying the protected region based on the scaled distance from the upper boundary. A similar determination is made based by scaling the distance from the leftmost boundary in the ad by a factor based on a width of the ad by a width of the key frame associated with the modified ad.

Alternatively, features in the protected region of the ad are identified and compared to features in the modified ad. The protected region is positioned in the modified ad based on features in the modified ad similar to features in the protected region of the ad. For example, the protected region of the ad includes a person's face. After generating a modified ad, features of the modified ad are identified and compared to features in the ad. In this example, the person's face is identified in the modified ad and compared to features of the ad, because the face identified from the modified ad has at least a threshold similarity to the face identified from the ad, the protected region is scaled based on the dimensions of the modified ad and positioned in the modified ad at a location based on the face identified from the modified ad.

In some embodiments, limits on the amount of modification to elements in different layers of the ad may be applied. These limits may be applied to maintain a threshold amount of informative or contextual value of the modified ads. For example, a minimum size may be associated with text elements to maintain legibility of the text elements. As another example, different foreground layers may be assigned different weights to specify a relative importance of elements in different foreground layers. For example, elements in a foreground layer having at least threshold weight are scaled to a minimum size while elements in a foreground layer having less than a threshold weight are not associated with a minimum size for scaling. As another example, elements included in foreground layers are scaled by amounts inversely proportional to the weights associated with the foreground layers. Returning to the example health insurance ad from above, a foreground layer including the insurance provider logo has a higher weight than a foreground layer including the person, as the insurance provider logo is more relevant to the advertiser. Thus, when the foreground layers are reduced in size, the foreground layer including the person is reduced by a greater amount than the foreground layer including the insurance provider logo.

Elements of the ad may be repositioned in one or more modified ads to preserve presentation of one or more elements of the ad in a modified ad. For example, text elements may be repositioned in a modified ad to maximize the amount of text presented to a user. In one embodiment, after resizing elements in foreground layers of an ad, one or more of the resized elements are repositioned to increase the number of the resized elements presented in the modified ad. In one embodiment, an advertiser associated with the ad identifies one or more elements of an advertisement capable of being reorganized. Alternatively, an advertiser may identify a priority level for various elements in the ad, so elements having at least a threshold priority level may be repositioned to be presented in various sizes of modified ads. For example, after resizing elements associated with foreground layers and cropping elements associated with background layers, the digital magazine server 140 may determine that an element with a threshold priority level is not included and reorganize elements in the modified ad so the element with the threshold priority is presented.

A modified ad is associated with a key frame for which the modified ad was generated to identify a size of a display region in which the modified ad is to be presented. The modified ad and an association between the modified ad and a key frame are stored 425 by the digital magazine server 140. For example, an identifier associated with a modified ad is stored 425 along with information identifying a key frame in a table or other suitable storage structure in the content store 215.

When the digital magazine server 140 presents content to a user, a page template is identified 430 from the template store 210 to specify the placement and sizing of content items presented to the user relative to each other. Additionally, a slot in the identified template in which the ad is to be presented to the user is indentified. For example, information from the layout engine 220 identifying the page template, an ad to be presented in a page generated using the identified page template, and a slot for presenting the ad is communicated to the advertisement sizing module 250. The information identifying the slot for presenting the ad includes a description of the dimensions or size of the slot for presenting the ad (e.g., a width and height of the slot in pixels, an aspect ratio and a dimension of the slot, or other description of the size of the slot).

Based at least in part on the identified page template and slot identified in the page template for presenting the ad, a key frame is determined 435. In one embodiment, a key frame having dimensions matching, or having at least a threshold similarity, to dimensions of the slot identified in the page template for presenting the ad is determined. For example, a key frame having a dimension and an aspect ratio matching a dimension and an aspect ratio of the slot identified for presenting the ad is determined 435 from the key frames associated with the slot for presenting the ad.

A modified ad associated with the ad for presentation to the user is selected 440 based at least in part on the key frame associated with the slot for presenting the ad. For example, using the determined key frame, a modified ad associated with the ad and with the determined key frame is selected 440. Hence, the modified ad associated with dimensions matching, or similar to, dimensions of the slot for presenting the ad is selected 440 to maximize the information associated with the ad presented to the user. In one embodiment, if the determined key frame has a size that does not match a key frame associated with a modified ad, an additional modified ad is generated by interpolating using a modified ad associated with a key frame having a size larger than the determined key frame and a modified ad associated with a key frame having a size smaller than the determined key frame. For example, a modified ad associated with a key frame having a smaller size than the determined key frame and within a threshold size difference from the determined key frame and a modified ad associated with a key frame having a larger size than the determined key frame and within the threshold size difference from the determined key frame are identified. Using linear interpolation or quadratic interpolation, layers in the modified ad associated with the key frame having the smaller size than the determined key frame are scaled to the size of the determined key frame based at least in part on characteristics of the modified ad associated with the key frame having the larger size than the determined key frame, in one embodiment.

Alternatively, the modified ad associated with the key frame having the smaller size than the determined key frame and the modified ad associated with the key frame having the larger size than the determined key frame are manually reviewed to determine how to scale layers in the modified ads. In another embodiment, one or more layers in a modified ad include an attribute specifying the extent to which the layer may be scaled or whether the layer may be scaled. For example, the modified ad comprises a layer including an image of a cookie and a layer including text placed below the cookie that is associated with an attribute specifying a limit on how the layer including the text may be scaled (e.g., an upper or lower bound on resizing the layer including the text); hence, the layer including the cookie may be resized differently than the layer including the text, because of the attribute of the layer including the text. Alternatively, each layer of modified ad is proportionally scaled to a size of the determined key frame.

The selected modified ad is then presented to the user along with other content items in locations relative to each other based on the slots in the identified page template. In one embodiment, a page template is selected and a slot in the page template is identified for presenting an ad. The ad is retrieved and separated into one or more layers, as described above. Based on the layers and dimensions of the slot identified for presenting the ad, a modified ad is generated, as described above. The modified ad is then presented to the user in a location and with dimensions determined from the identified slot. Hence, a modified ad may be dynamically generated based on the size of the slot in which the ad is to be presented.

Figure 5:
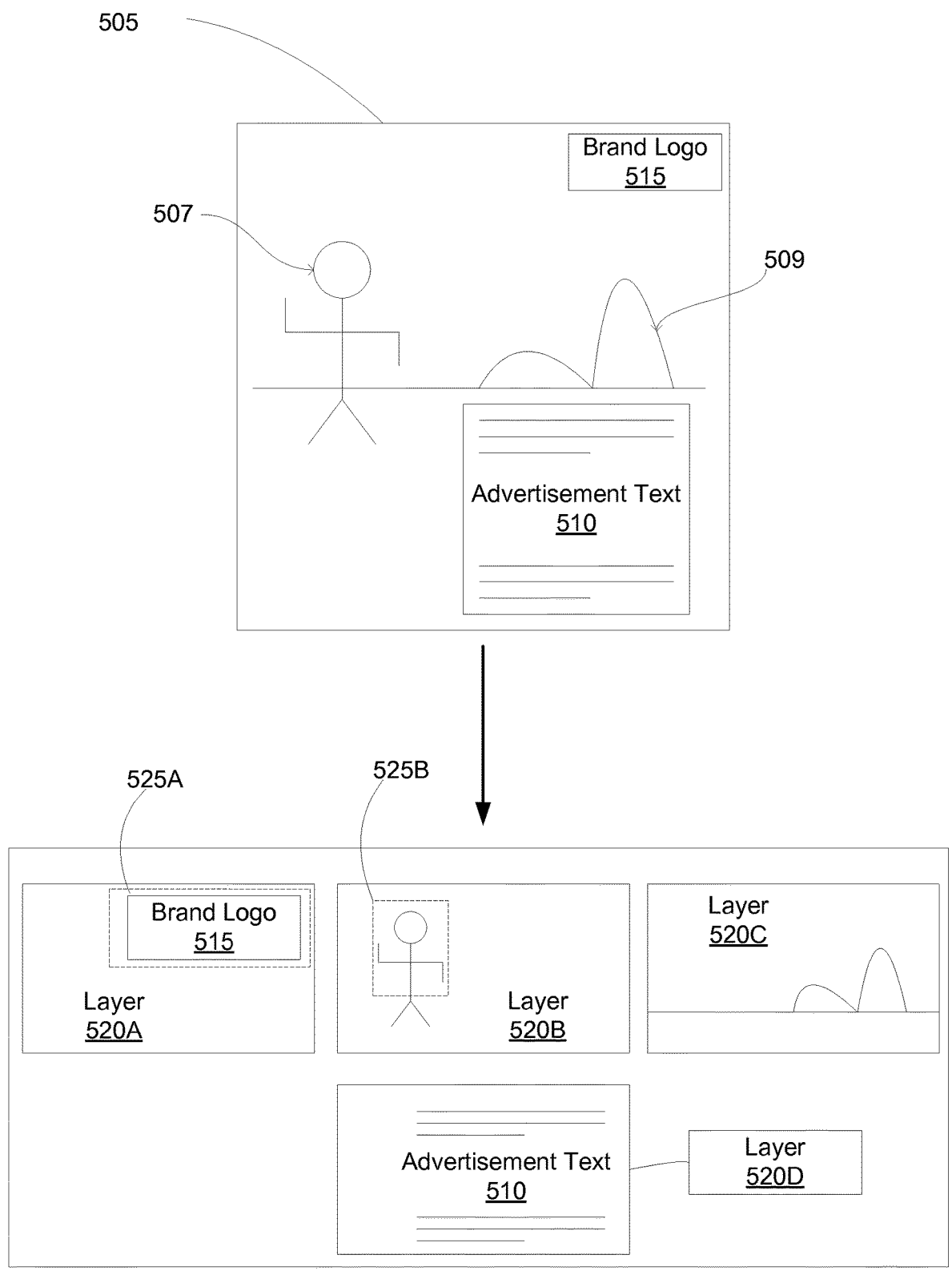
FIG. 5 is an example of layers in an advertisement, in accordance with an embodiment of the invention.

FIG. 5 is an example of layers identified from an advertisement ("ad"). In the example of FIG. 5, an ad 505 includes an image of a person 507, an advertisement text 510, a brand logo 515 and an image of scenery 509. The ad text 510 describes a product associated with the ad 505. For example, the ad text 510 includes information describing product features, product pricing, product testimonials, or other suitable information associated with a product or service. As described above in conjunction with FIG. 4, the ad 505 is separated into a plurality of layers 520.

In the example of FIG. 5 two foreground layers 520A, 520B are identified from the ad 505. Layer 520A includes the brand logo 515, while layer 520B includes the image of the person 507. For purposes of illustration, the brand logo 515 and the image of the person 507 are identified as the primary focus of the ad 505 based on information received from an advertiser or determined by analyzing additional advertisements received from the advertiser. Hence, the image of the person 507 and the brand logo 505 are identified using foreground layers 520A, 520B. As described above in conjunction with FIG. 4, elements included in a foreground layer 520 are identified as the primary focus of the ad 505.

Additionally, layer 520C including the image of the scenery 509 is identified as a background layer. Based on information received from an advertiser associated with the ad or determined from another suitable source, the image of the scenery 509 is not identified as the primary focus of the ad, so layer 52C is identified as a background layer. In the example of FIG. 5, a text layer 502D including the ad text 510 is also identified; in one embodiment, the ad text 510 is included in a layer identified as a foreground layer. FIG. 5 also shows identification of protected regions 525 in the ad 505, which identify regions of the ad 505 having content not to be obscured. In FIG. 5, a protected region 525A including the brand logo 515 and a protected region 525B including a portion of the image of the person 507 are identified to prevent the brand logo 515 and the portion of the image of the person 507 from being obscured.

Figure 6:
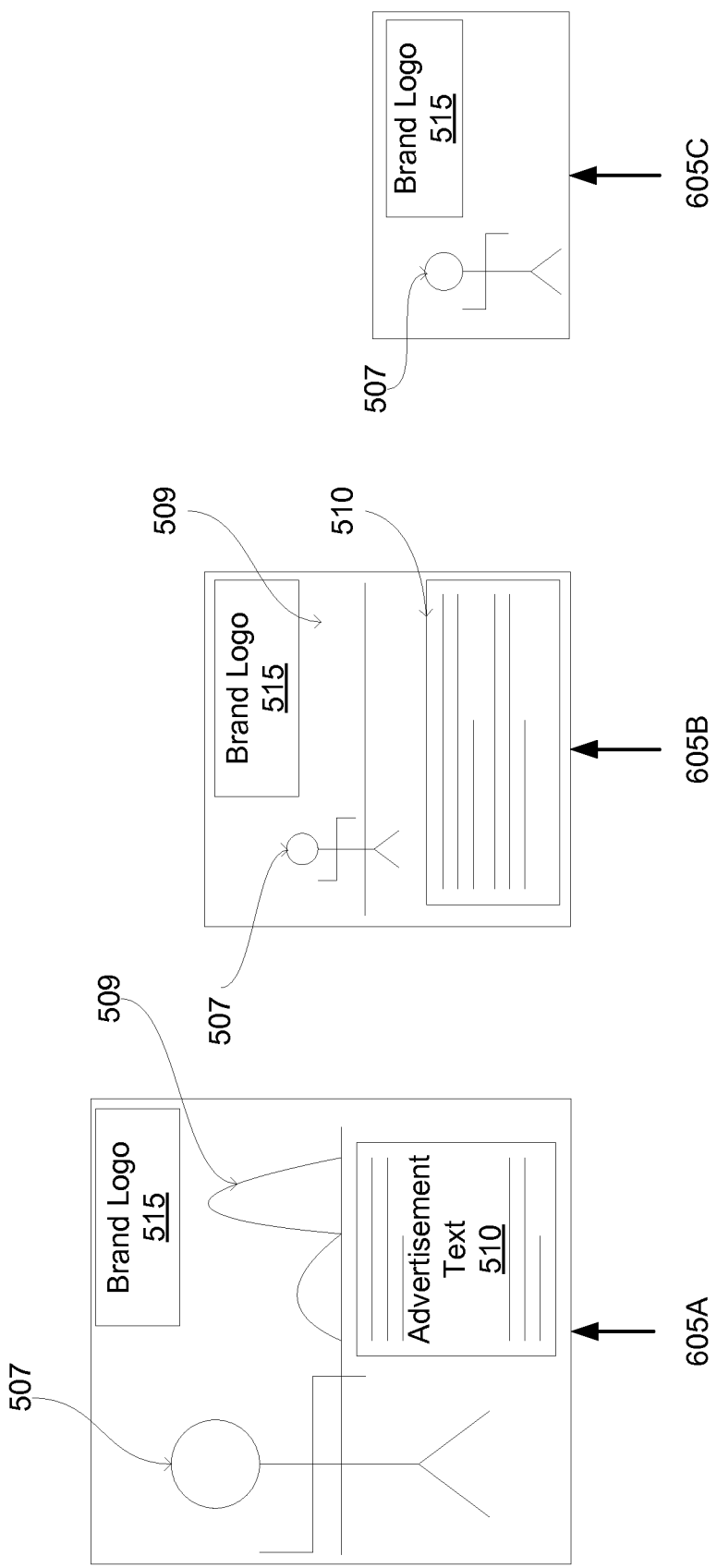
FIG. 6 is an example of modified advertisements generated from layers in an advertisement, in accordance with an embodiment of the invention.

FIG. 6 is a diagram illustrating modified advertisements associated with different key frames. The modified advertisements (ads) 605A, 605B, 605C shown in FIG. 6 are generated from the ad 505 shown in FIG. 5 and are each associated with target key frame having different dimensions. In modified ad 605A, elements in the foreground layers 520A, 520B and in the text layer 520D are reduced in size, while elements the layer 520C identified as a background layer are cropped to maintain the content of the ad 505 in the dimensions of the key frame associated with modified ad 605A.

Modified ad 605B is generated by cropping elements in the layer 520C identified as the background so the image of the scenery 509 is removed, while the image of the person 507 are reduced in size based on the dimensions of the key frame associated with modified ad 605B. Additionally, the ad text 510 in the text layer 520D is reduced in size and repositioned from its position in the ad 505 to be presented below the scaled image of the person 507 in modified ad 605B. In the example of FIG. 6, the brand logo 510 is not modified in size from the ad 505 to the modified ad 605B. Hence, elements in different layers 520 of the ad 505 are differently modified to generate modified ad 605B to preserve the informative and contextual value of the ad 505.

Modified ad 605C, associated with another key frame, is generated by removing the text layer 520D and further removing elements from layer 520C, which was identified as the background layer. Further, the image of the person 507 in foreground layer 520B is further reduced in size in modified ad 605C, and the brand logo 515 in foreground layer 520A remains unmodified from the ad 505 to modified ad 605C. Additionally, each of the modified ads 605A, 605B, 605C do not obscure elements included in a protected region 525, regardless of the key frame associated with a modified ad 605.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for modifying an advertisement, the method comprising:

storing a plurality of page templates at a digital magazine server including a processor, each page template including one or more slots specifying a layout of content items to be presented in the one or more slots relative to each other;

receiving an advertisement request at the digital magazine server including an advertisement for display to a user of the digital magazine server and a bid amount;

separating, by the processor of the digital magazine server, the advertisement included in the advertisement request into multiple layers comprising one or more foreground layers of the advertisement, each foreground layer of the advertisement including one or more elements of the advertisement identified as a focus of the advertisement for display to the user and each foreground layer assigned a weight specifying an importance of elements included in a foreground layer relevant to elements included in other foreground layers; and one or more background layers of the advertisement, each background layer of the advertisement including one or more elements of the advertisement for display to the user;

determining one or more target key frames based on sizes associated with one or more slots included in one or more of the page templates stored by the digital magazine server, different target key frames associated with different sizes of regions of display devices in which content is presented to the user;

generating a plurality of modified advertisements by the processor of the digital magazine server scaling one or more elements of the advertisement in the foreground layer of the advertisement by an amount inversely proportional to the weight assigned to the foreground layer of the advertisement and the digital magazine server repositioning one or more elements in the foreground layer of the advertisement that have at least a threshold priority level identified by an advertiser associated with the advertisement and the digital magazine server performing a different modification on one or more elements of the advertisement in a background layer of the advertisement, the digital magazine server associating each modified advertisement with a target key frame;

storing each modified advertisement and an association between a modified advertisement and information describing the target key frame for which the modified ad was generated at the digital magazine server;

selecting a page template by the digital magazine server for presenting content items to the user, the page template including a slot identified for presenting the advertisement;

determining a key frame from the one or more target key frames by the digital magazine server based at least in part on one or more dimensions of the slot identified for presenting the advertisement;

selecting a modified advertisement associated with the determined key frame by the processor of digital magazine server; and displaying the selected modified advertisement to the user in a location of a display device specified by the slot including the advertisement.

2. The computer-implemented method of claim 1, wherein generating the plurality of modified advertisements by the processor of the digital magazine server modifying one or more elements of the advertisement in the foreground layer of the advertisement and performing the different modification on one or more elements of the advertisement in the background layer of the advertisement comprises:

resizing one or more elements in the one or more foreground layers based at least in part on one or more sizes associated with a key frame; and cropping one or more elements in the one or more background layers based at least in part on one or more sizes associated with the key frame.

3. The computer-implemented method of claim 2, wherein resizing one or more elements in the one or more foreground layers based at least in part on one or more sizes associated with the key frame comprises:
    scaling the one or more elements in the one or more foreground layers based at least in part on one or more dimensions of the key frame.

4. The computer-implemented method of claim 1, wherein identify one or more foreground layers of the advertisement further comprises:
    identify one or more protected regions of the advertisement, a protected region identifying a region of the advertisement associated with an element of the advertisement not to be obscured.

5. The computer-implemented method of claim 4, wherein a modified advertisement does not obscure an element of the advertisement identified by the protected region.

6. The computer-implemented method of claim 1, wherein determining the key frame from the one or more target key frames by the digital magazine server based at least in part on one or more dimensions of the slot identified for presenting the advertisement comprises:
    identifying a key frame having a size having at least a threshold similarity to a size of the slot identified for presenting the advertisement determined form the dimensions of the slot for presenting the advertisement.

7. The computer-implemented method of claim 1, wherein selecting the modified advertisement associated with the determined key frame by the processor of the digital magazine server comprises:
    identifying a modified ad associated with a key frame having a size smaller than a size associated with the slot including the advertisement;
    identifying a modified ad associated with a key frame having a size larger than the size associated with the slot including the advertisement;
    generating the modified ad associated with the determined key frame based at least in part on the modified ad associated with the key frame having the size smaller than the size associated with the slot including the advertisement and on the modified ad associated with the key frame having the size larger than the size associated with the slot including the advertisement.

8. A computer-implemented method for modifying an advertisement, the method comprising:
    receiving an advertisement for display to a user of a digital magazine server including a processor;
    identifying a plurality of layers of the advertisement by the processor of the digital magazine server applying one or more image processing methods based on one or more selected from a group consisting of sharpness of regions in the advertisement, the color composition of regions in the advertisement, a number of edges of identified objects in an advertisement, and any combination thereof to the advertisement, each layer including one or more elements of the advertisement;
    determining one or more target key frames associated with one or more slots included in one or more page templates stored by the processor of the digital magazine server, each target key frame associated with a size of a slot in a page template in which content is presented to the user;
    generating a plurality of modified advertisements by the processor of the digital magazine server scaling one or more elements of the advertisement in layers of the advertisement by scaling one or more elements of the advertisement by amounts inversely proportional to weights assigned to the layers of the advertisement including the one or more elements and the digital magazine server repositioning one or more elements having at least a threshold priority level associated with one or more elements of the advertisement by an advertiser associated with the advertisement, each modified advertisement associated with a target key frame;
    storing each modified advertisement and an association between a modified advertisement and information describing the target key frame for which the modified ad was generated at the digital magazine server;
    selecting a page template for presenting content items to the user by the digital magazine server, the page template including a slot identified for presenting the advertisement;
    determining, by the digital magazine server, a key frame from the one or more target key frames based at least in part on one or more dimensions of the slot identified for presenting the advertisement;
    selecting by the processor of the digital magazine server, a modified advertisement associated with the determined key frame; and
    displaying the selected modified advertisement to the user in a location of a display device specified by the slot including the advertisement.

9. The computer-implemented method of claim 8, wherein identifying the plurality of layers of the advertisement by the processor of digital magazine server applying one or more image processing methods to the advertisement comprises:
    identifying one or more foreground layers of the advertisement, each foreground layer of the advertisement including one or more elements of the advertisement identified as a focus of the advertisement for display to the user; and
    identifying one or more background layers of the advertisement, each background layer of the advertisement including one or more elements of the advertisement for display to the user.

10. The computer-implemented method of claim 9, wherein generating the plurality of modified advertisements by the processor of the digital magazine server scaling one or more elements of the advertisement in layers of the advertisement by scaling one or more elements of the advertisement by amounts inversely proportional to weights assigned to the layers of the advertisement including the one or more elements and the digital magazine server repositioning one or more elements having at least a threshold priority level associated with one or more elements of the advertisement by an advertiser associated with the advertisement comprises:
    resizing one or more elements in the one or more foreground layers based at least in part on one or more sizes associated with a key frame; and
    cropping one or more elements in the one or more background layers based at least in part on one or more sizes associated with the key frame.

11. The computer-implemented method of claim 10, wherein resizing one or more elements in the one or more foreground layers based at least in part on one or more sizes associated with the key frame comprises:
    scaling the one or more elements in the one or more foreground layers based at least in part on one or more dimensions of the key frame.

12. The computer-implemented method of claim 9, wherein generating the plurality of modified advertisements by the processor of the digital magazine server scaling one or more elements of the advertisement in layers of the advertisement by scaling one or more elements of the advertisement by amounts inversely proportional to weights assigned to the layers of the advertisement including the one or more elements and the digital magazine server repositioning one or more elements having at least a threshold priority level associated with one or more elements of the advertisement by an advertiser associated with the advertisement comprises:

applying a modification to the sizing of elements included in at least one foreground layer; and applying an alternative modification to the sizing of elements included in at least one background layer.

13. The computer-implemented method of claim 8, wherein identifying the plurality of layers of the advertisement comprises:

identifying one or more protected regions of the advertisement, a protected region identifying a region of the advertisement associated with an element of the advertisement not to be obscured.

14. The computer-implemented method of claim 13, wherein a modified advertisement does not obscure an element of the advertisement identified by the protected region.

15. The computer-implemented method of claim 8, wherein determining, by the digital magazine server, the key frame from the one or more target key frames based at least in part on one or more dimensions of the slot identified for presenting the advertisement comprises:

identifying a key frame having a size having at least a threshold similarity to a size of the slot identified for presenting the advertisement determined form the dimensions of the slot for presenting the advertisement.

16. A non-transitory computer program product comprising a computer-readable storage medium having instructions encoded thereon that, when executed by a processor, cause the processor to:

receive an advertisement for display to a user of a digital magazine server, the digital magazine server including a processor;

identify a plurality of layers of the advertisement by the processor of the digital magazine server applying one or more image processing methods to the advertisement based on one or more selected from a group consisting of sharpness of regions in the advertisement, the color composition of regions in the advertisement, a number of edges of identified objects in an advertisement, and any combination thereof, each layer including one or more elements of the advertisement;

determine one or more target key frames associated with one or more slots included in one or more page templates stored by the digital magazine server, each target key frame associated with a size of a slot in a page template in which content is presented to the user;

generate a plurality of modified advertisements by the processor of the digital magazine server scaling one or more elements of the advertisement in layers of the advertisement by scaling one or more elements of the advertisement by amounts inversely proportional to weights assigned to the layers of the advertisement including the one or more elements and the digital magazine server repositioning one or more elements having at least a threshold priority level associated with one or more elements of the advertisement by an advertiser associated with the advertisement, each modified advertisement associated with a target key frame;

store each modified advertisement and an association between a modified advertisement and information describing the target key frame for which the modified ad was generated at the digital magazine server;

select a page template for presenting content items to the user by the digital magazine server, the page template including a slot identified for presenting the advertisement;

determine, by the digital magazine server, a key frame from the one or more target key frames based at least in part on one or more dimensions of the slot identified for presenting the advertisement;

select a modified advertisement associated with the determined key frame by the processor of the digital magazine server; and display the selected modified advertisement to the user in a location of a display device specified by the slot including the advertisement.

17. The computer program product of claim 16, wherein identify the plurality of layers of the advertisement by the processor of the digital magazine server applying one or more image processing methods to the advertisement comprises:

identify one or more foreground layers of the advertisement, each foreground layer of the advertisement including one or more elements of the advertisement identified as a focus of the advertisement for display to the user; and identify one or more background layers of the advertisement, each background layer of the advertisement including one or more elements of the advertisement for display to the user.

\* \* \* \* \*